United States Patent
Fujikawa et al.

(10) Patent No.: US 12,498,892 B2
(45) Date of Patent: Dec. 16, 2025

(54) DATA PROCESSING DEVICE AND IMAGE FORMING SYSTEM CAPABLE OF EASILY SELECTING IMAGE DATA OF HIGHEST QUALITY

(71) Applicant: KYOCERA Document Solutions Inc., Osaka (JP)

(72) Inventors: Takuma Fujikawa, Osaka (JP); Nobushiro Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 210 days.

(21) Appl. No.: 18/290,658

(22) PCT Filed: Jul. 25, 2022

(86) PCT No.: PCT/JP2022/028628
§ 371 (c)(1),
(2) Date: Jan. 19, 2024

(87) PCT Pub. No.: WO2023/008370
PCT Pub. Date: Feb. 2, 2023

(65) Prior Publication Data
US 2024/0427533 A1     Dec. 26, 2024

(30) Foreign Application Priority Data
Jul. 29, 2021   (JP) ................. 2021-124073

(51) Int. Cl.
*G06F 3/12* (2006.01)
*G06T 7/00* (2017.01)

(52) U.S. Cl.
CPC .......... *G06F 3/1208* (2013.01); *G06F 3/1205* (2013.01); *G06F 3/1237* (2013.01);
(Continued)

(58) Field of Classification Search
CPC .... G06F 3/1208; G06F 3/1205; G06F 3/1237; G06F 3/1256; G06F 3/1285; G06T 7/0002; G06T 2207/30168
See application file for complete search history.

(56) References Cited

U.S. PATENT DOCUMENTS

| | | | |
|---|---|---|---|
| 2008/0278437 A1* | 11/2008 | Barrus | H04N 1/00347 345/156 |
| 2013/0293913 A1* | 11/2013 | Takayama | H04N 1/00063 358/1.13 |

(Continued)

FOREIGN PATENT DOCUMENTS

| | | |
|---|---|---|
| JP | 2005049968 A | 2/2005 |
| JP | 2016095787 A | 5/2016 |
| JP | 2017045181 A | 3/2017 |

*Primary Examiner* — Nicholas Pachol
(74) *Attorney, Agent, or Firm* — IP Business Solutions, LLC.

(57) ABSTRACT

A data processing device includes a collation device that decides whether first image data and second image data originate from same image data, a comparison device that compares image quality between the first image data and the second image data, when the first image data and the second image data originate from the same image data, and a display controller that causes a display device to display, according to a comparison result from the comparison device, one of a first image represented by the first image data and a second image represented by the second image data, as a selectable image that can be touched through an input device, and the other of the first image and the second image as an unselectable image unable to be selected through the input device.

9 Claims, 8 Drawing Sheets

(52) U.S. Cl.
CPC .......... *G06F 3/1256* (2013.01); *G06F 3/1285* (2013.01); *G06T 7/0002* (2013.01); *G06T 2207/30168* (2013.01)

(56) References Cited

U.S. PATENT DOCUMENTS

2016/0140715 A1     5/2016   Wakita et al.
2018/0338053 A1*   11/2018   Younis ............... H04N 1/00636

* cited by examiner

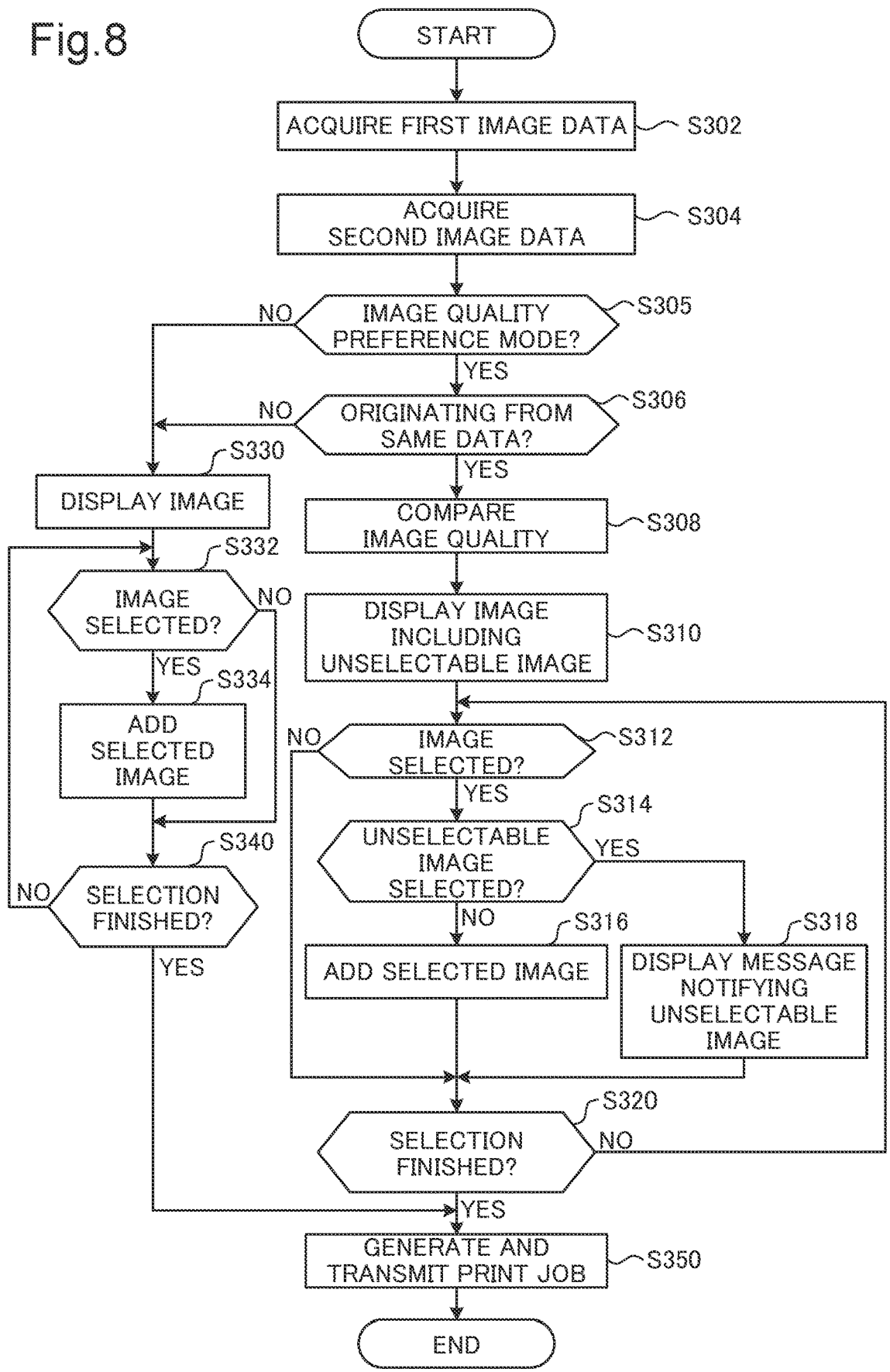

DATA PROCESSING DEVICE AND IMAGE FORMING SYSTEM CAPABLE OF EASILY SELECTING IMAGE DATA OF HIGHEST QUALITY

TECHNICAL FIELD

The present invention relates to a data processing device and an image forming system.

BACKGROUND ART

Image data such as a photo is often uploaded on the WEB. For example, many users are uploading image data on a social networking service (SNS). Users of a terminal device having a camera and a communication function, for example a smartphone, are uploading image data generated from the photo that has been shot, on the SNS. Such image data that has been uploaded is often saved with a compressed data volume. Accordingly, a techniques is known that includes printing, when the terminal device possesses original image data, representing the same image based on the uploaded image data, the photo represented by the original image data in the terminal device, instead of the photo based on the uploaded image data, for example as disclosed in Patent Literature (PTL) 1.

The image processing device according to PTL 1 collates, when printing a photo represented by image data acquired from a server apparatus, the image data acquired from the server apparatus with the image data in the terminal device. When the image data acquired from the server apparatus accords with the image data in the terminal device, the image processing device prints the image data in the terminal device with priority, thereby outputting an image of a high quality.

Citation List

Patent Literature

PTL 1: Japanese Unexamined Patent Application Publication No. 2017-45181

SUMMARY OF INVENTION

Technical Problem

Although the image processing device according to PTL 1 accepts an instruction for selecting the photo represented by the image data acquired from the server, the image processing device does not display at the same time a plurality of photos, respectively represented by a plurality of image data stored in different sources. Therefore, the image processing device according to PTL 1 is unable to select a more appropriate image, out of the plurality of images respectively represented by the plurality of image data uploaded on different websites.

The present invention has been accomplished in view of the foregoing shortcoming, and provides a data processing device and an image forming system, capable of easily selecting image data of highest quality, out of a plurality of image data originating from the same image data.

Solution to Problem

In an aspect, the present invention provides a data processing device including a display device, an input device through which an instruction of an operator is inputted, a first acquisition device that acquires first image data, a second acquisition device that acquires second image data, a collation device that decides whether the first image data and the second image data originate from same image data, a comparison device that compares image quality between the first image data and the second image data, when the first image data and the second image data originate from the same image data, a display controller that causes the display device to display; according to a comparison result from the comparison device, one of a first image represented by the first image data and a second image represented by the second image data, as a selectable image, and the other of the first image and the second image as an unselectable image, and an execution device that executes, upon receipt of an instruction to select the selectable image through the input device, a predetermined operation with respect to the image data corresponding to the selectable image selected, but keeps from executing, despite receiving an instruction to select the unselectable image through the input device, the predetermined operation with respect to the image data corresponding to the unselectable image selected.

In another aspect, the present invention provides an image forming system including a data storage device, a data processing device, and an image forming apparatus. The data storage device includes a first storage device for storing second image data, a first communication device that communicates with the data processing device, and a first control device that transmits the second image data to the data processing device via the first communication device. The data processing device includes a display device, an input device through which an instruction of an operator is inputted, a second storage device for storing first image data, a second communication device that communicates with the data storage device, a first acquisition device that acquires the first image data from the second storage device, a second acquisition device that acquires, via the second communication device, the second image data transmitted from the data storage device, a collation device that decides whether the first image data and the second image data originate from same image data, a comparison device that compares image quality between the first image data and the second image data, when the first image data and the second image data originate from the same image data, a display controller that causes the display device to display, according to a comparison result from the comparison device, one of a first image represented by the first image data and a second image represented by the second image data, as a selectable image, and the other of the first image and the second image as an unselectable image, and a generation device that generates, upon receipt of an instruction to select the selectable image through the input device, a print job based on the image data corresponding to the selectable image selected, and transmits the print job to the image forming apparatus via the second communication device, but keeps from generating, despite receiving an instruction to select the unselectable image through the input device, the print job based on the image data corresponding to the unselectable image selected. The image forming apparatus includes a third communication device that communicates with the data processing device, an image forming device that executes the print job thereby forming an image on a recording medium, and a second control device that causes the image forming device to execute the print job, upon acquiring the print job via the third communication device.

In still another aspect, the present invention provides a data processing device including a display device, an input device through which an instruction of an operator is inputted, a first acquisition device that acquires first data, a second acquisition device that acquires second data, a collation device that decides whether the first data and the second data originate from same data, a comparison device that compares quality between the first data and the second data, when the first data and the second data originate from the same data, a display controller that causes the display device to display, according to a comparison result from the comparison device, one of a first image represented by the first data and a second image represented by the second data, as a selectable image, and the other of the first image and the second image as an unselectable image, and an execution device that executes, upon receipt of an instruction to select the selectable image through the input device, a predetermined operation with respect to the data corresponding to the selectable image selected, but keeps from executing, despite receiving an instruction to select the unselectable image through the input device, the predetermined operation with respect to the data corresponding to the unselectable image selected.

Advantageous Effects of Invention

The foregoing configuration enables image data of highest quality to be easily selected, out of a plurality of image data originating from the same image data.

BRIEF DESCRIPTION OF DRAWINGS

FIG. 8 is a flowchart showing a print job execution process.

DESCRIPTION OF EMBODIMENT

Figure 1:
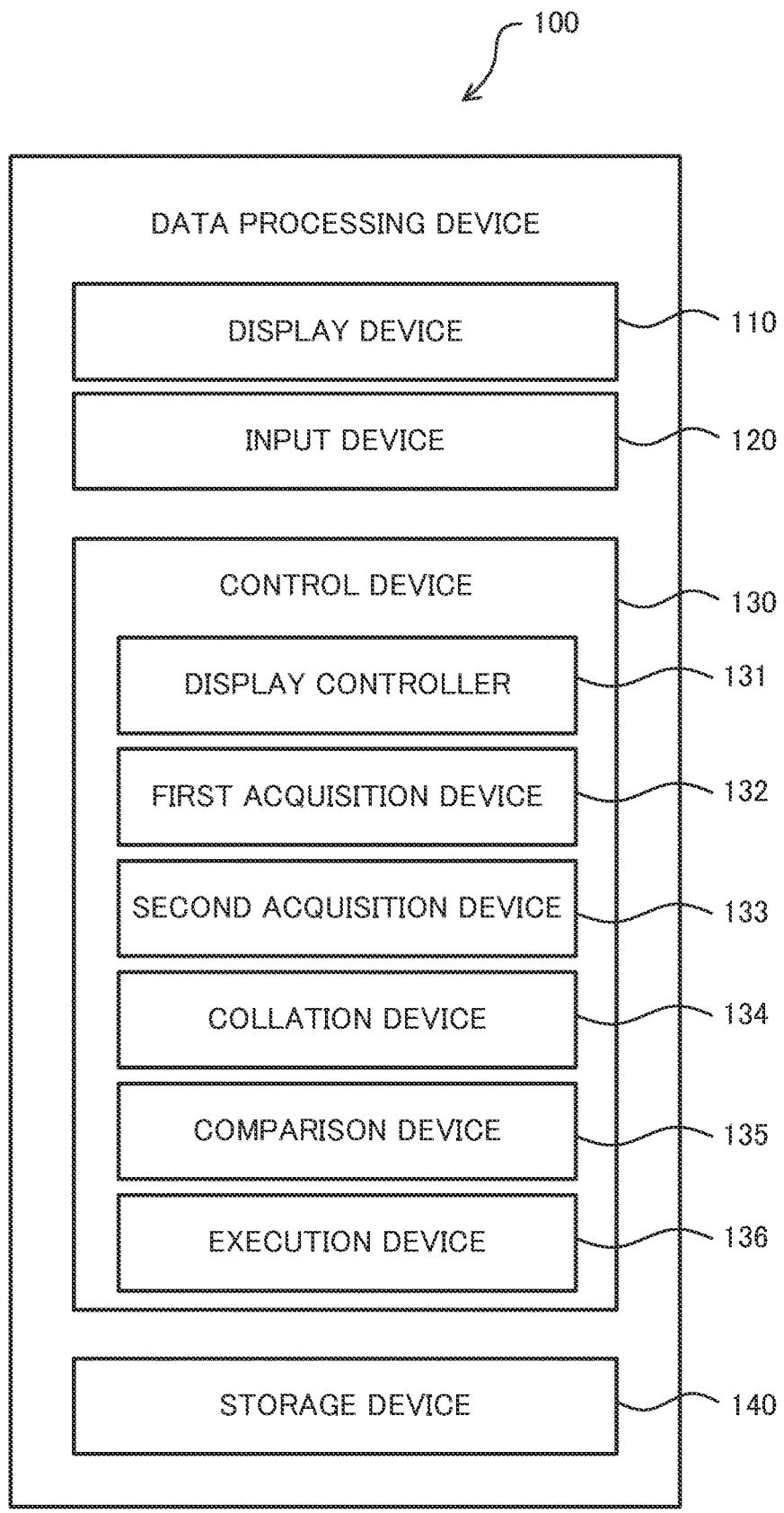
FIG. 1 is a block diagram schematically showing a configuration of a data processing device.

Hereafter, a data processing device and an image forming system according to an embodiment of the present invention will be described, with reference to the drawings. In the drawings, the same or corresponding elements are given the same reference numeral, and the description of such elements will not be repeated.

Referring to FIG. 1, the data processing device 100 according to the embodiment will be described. FIG. 1 is a schematic block diagram showing a configuration of the data processing device 100. The data processing device 100 is, for example, a smartphone. Alternatively, the data processing device 100 may be a tablet computer or a personal computer (PC).

As shown in FIG. 1, the data processing device 100 includes a display device 110, an input device 120, a control device 130, and a storage device 140.

The display device 110 displays the image represented by the image data. Typically, the display device 110 displays a plurality of images respectively represented by a plurality of pieces of image data, in the form of thumbnail images. The image data represents, for example, a photo or picture in color or B/W. The image data may be generated by an image sensor of, for example, a camera.

The display device 110 includes a liquid crystal display (LCD), an organic electroluminescence (EL) display, or a plasma display.

To the input device 120, instructions of the operator are inputted. The operator can operate images displayed on the display device 110, through the input device 120. For example, the operator can select an image among the images displayed on the display device 110, through the input device 120.

The input device 120 includes a touch sensor. The display device 110 and the input device 120 may be unified into a touch panel. The input device 120 may include buttons or a keyboard.

The control device 130 includes an arithmetic element. The arithmetic element includes a processor. In an example, the processor includes a central processing unit (CPU). The processor may include an application-specific integrated circuit (ASIC).

In the storage device 140, data and computer programs are stored. The storage device 140 includes storage elements. The storage device 140 includes main storage elements such as a semiconductor memory, and auxiliary storage elements such as a semiconductor memory or a hard disk drive. The storage device 140 may include a removable medium.

The computer programs are, for example, stored in a non-transitory, computer-readable storage medium. The non-transitory, computer-readable storage medium includes a read-only memory (ROM), a random-access memory (RAM), a CD-ROM, a magnetic tape, a magnetic disk, or an optical data storage device.

In the storage device 140, various types of data are stored. For example, control programs are stored in the storage device 140. The control device 130 controls the operation of the display device 110, the input device 120, and the storage device 140, according to the control programs stored in the storage device 140.

Various types of image data are also stored in the storage device 140. For example, two types of image data, originating from the same source image, are stored in the storage device 140. In an example, image data with compressed data volume, and image data with uncompressed data volume are stored in the storage device 140. The image data not subjected to image processing, and the image data subjected to the image processing may be stored in the storage device 140.

The control device 130 controls the operation of the data processing device 100, by executing the control program. To be more specific, the processor of the control device 130 controls the operation of each of the components of the data processing device 100, by executing the control programs stored in the storage element of the storage device 140.

The storage device 140 contains computer programs. The control device 130 acts as a display controller 131, a first acquisition device 132, a second acquisition device 133, a collation device 134, a comparison device 135, and an execution device 136, by executing the computer programs.

The display controller 131 controls the displaying operation of the display device 110. Under the control of the display controller 131, the display device 110 switches the images to be displayed.

The first acquisition device 132 acquires first image data. Typically, the first acquisition device 132 acquires a plurality of pieces of first image data. The first image data may be image data shot by a camera, image data processed by the control device 130, or image data processed by an external device.

The first acquisition device 132 may acquire the first image data from the storage device 140, or from the external device.

The second acquisition device 133 acquires second image data. Typically, the second acquisition device 133 acquires a plurality of pieces of second image data. The second image data may be image data shot by a camera, image data processed by the control device 130, or image data processed by an external device.

Typically, the second image data is different from the first image data, at least in an aspect. For example, the second image data may be stored in a device different from the device in which the first image data is stored, and the second image data may be subjected to a different processing from the first image data. For example, the second image data may be generated by compressing the data volume of the first image data, or by subjecting the first image data to a predetermined image processing. Alternatively, the first image data and the second image data may be subjected to the data compression, such that the resultant data volume becomes different from each other. The first image data and the second image data may be subjected to the image processing, in different manners from each other.

The second acquisition device 133 may acquire the second image data from the storage device 140, or from the external device.

The collation device 134 collates between the first image data and the second image data. Typically, the collation device 134 decides whether the first image data and the second image data originate from the same image data. For example, when the second image data is generated by subjecting the first image data to at least one of the data compression and the image processing, the collation device 134 decides that the first image data and the second image data originate from the same image data. Conversely, also when the first image data is generated by subjecting the second image data to at least one of the data compression and the image processing, the collation device 134 decides that the first image data and the second image data originate from the same image data. Further, when the first image data is generated by subjecting given image data to at least one of the data compression and the image processing, and the second image data is generated by subjecting the same image data to at least one of the data compression and the image processing in a different manner, the collation device 134 decides that the first image data and the second image data originate from the same image data.

For example, when the first image data and the second image data each possess shooting information, including shooting location, shooting time, and shooting device, the collation device 134 may collate between the first image data and the second image data, by comparing the shooting information between the first image data and the second image data. In an example, the shooting information is included in the metadata of the Exchangeable Image File Format.

The collation device 134 may decide the similarity between the first image data and the second image data. For example, the collation device 134 may generate a light-dark histogram of the first image data and the second image data, to thereby collate between the first image data and the second image data. Alternatively, when a first image represented by the first image data and a second image represented by the second image data each include a human's face, the collation device 134 may collate between the first image data and the second image data, through a face authentication process.

The comparison device 135 compares the image quality between the first image data and the second image data, on the basis of the collation result from the collation device 134. For example, when the collation device 134 decides that the first image data and the second image data originate from the same image data, the comparison device 135 compares the image quality between the first image data and the second image data. When the first image data is higher in image quality than the second image data, the first image data is defined as the high-quality image data, and the second image data is defined as the low-quality image data. Conversely; when the second image data is higher in image quality than the first image data, the second image data is defined as the high-quality image data, and the first image data is defined as the low-quality image data.

For example, the comparison device 135 compares the image quality between the first image data and the second image data, on the basis of the data volume of the first image data and that of the second image data. Alternatively, when the first image data and the second image data each possess information indicating the resolution, the comparison device 135 compares the resolution between the first image data and the second image data, thereby comparing the image quality between the first image data and the second image data.

The display controller 131 controls the displaying operation of the display device 110, on the basis of the comparison result from the comparison device 135. For example, display controller 131 causes the display device 110 to display the image represented by one of the first image data and the second image data, in a form that enables the image to be selected through the input device 120, and to display the image represented by the other of the first image data and the second image data, in a form that disables such image from being selected through the input device 120.

The execution device 136 executes a predetermined operation, with respect to the image data to be processed corresponding to one of first image and the second image whichever is selected, according to an instruction inputted through the input device 120. For example, the execution device 136 transmits the image data to be processed to the external device. In an example, the execution device 136 transmits the image data to be processed to a facsimile machine. The execution device 136 may transmit the image data to be processed to the image forming apparatus. In this case, the image forming apparatus forms the image represented by the image data to be processed. Alternatively, the execution device 136 may store the image data to be processed in the storage device 140, and delete image data not to be processed, from the storage device 140.

Figure 2:
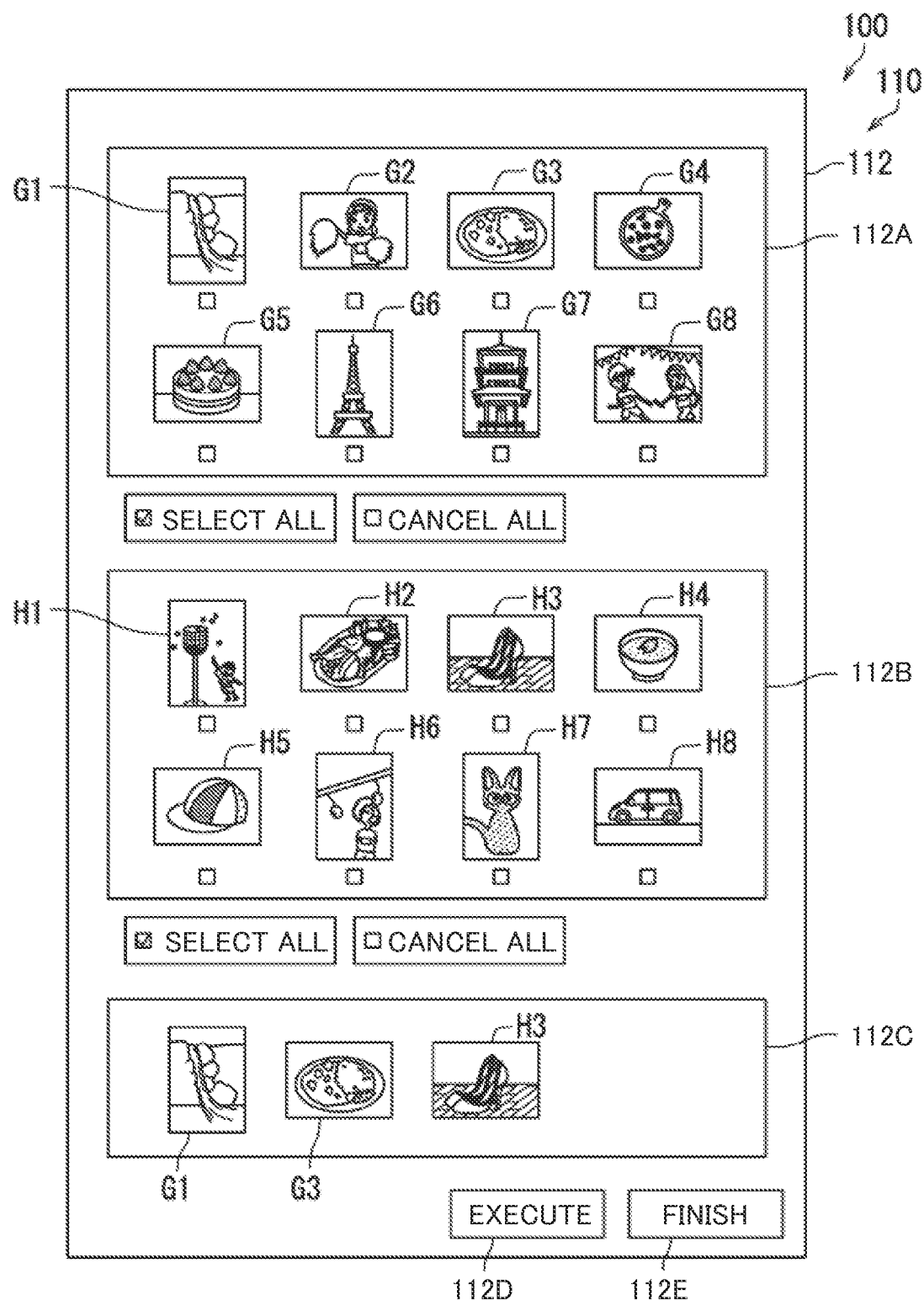
FIG. 2 is a schematic drawing showing an example of a display format of a first image and a second image, displayed when first image data and second image data do not originate from the same image data.
Figure 3:
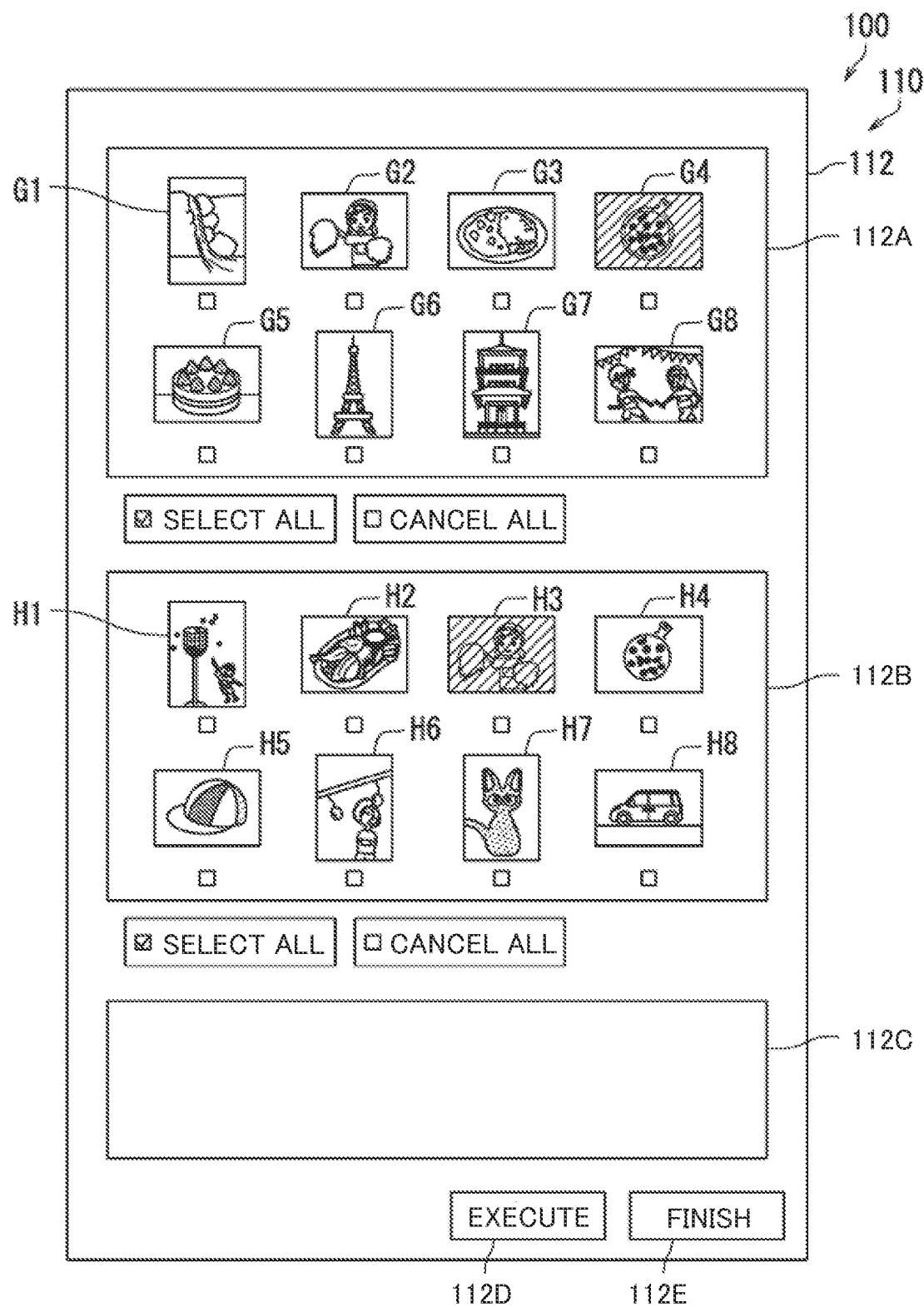
FIG. 3 is a is a schematic drawing showing an example of a display format of the first image and the second image, displayed when the first image data and the second image data originate from the same image data.

Referring now to FIG. 1 to FIG. 3, the display format of the first image represented by the first image data and the second image represented by the second image data, realized by the data processing device 100, will be described hereunder. FIG. 2 is a schematic drawing showing the display format of the first image and the second image, displayed when the first image data and the second image data do not originate from the same image data, in the data processing device 100. FIG. 3 is a is a schematic drawing showing the display format of the first image and the second image, displayed when the first image data and the second image data originate from the same image data, in the data processing device 100.

As shown in FIG. 2, the display device 110 includes a display screen 112. The display screen 112 includes a first region 112A for displaying the first image represented by the first image data, a second region 112B for displaying the second image represented by the second image data, a third region 112C for displaying the selected image, out of the first image displayed in the first region 112A and the second image displayed in the second region 112B, as the image to be processed, an execution button 112D for executing the operation with respect to the image data to be processed corresponding to the selected image, and a selection confirmation button 112E for finally confirming the selection of the image. In the illustrated example, the display controller 131 causes the display device 110 to display eight first images G1 to G8 in the first region 112A, and eight second images H1 to H8 in the second region 112B.

Here, the first image data corresponding to the first images displayed in the first region 112A are stored in a different format from the second image data corresponding to the second images displayed in the second region 112B. For example, the display controller 131 causes the display device 110 to display the first images on the basis of the first image data acquired from the storage device 140, and to display the second images on the basis of the second image data acquired from the external device.

Alternatively, the display controller 131 may cause the display device 110 to display the first images on the basis of the first image data not subjected to the data compression, and to display the second images on the basis of the second image data subjected to the data compression. Further, the display controller 131 may cause the display device 110 to display the first images on the basis of the first image data not subjected to the image processing, and to display the second images on the basis of the second image data subjected to the image processing.

The operator of the data processing device 100 can select the first image, by pointing the first image displayed in the first region 112A, through the input device 120. Upon accepting the selection of the first image, the display controller 131 causes the display device 110 to display the first image selected, in the third region 112C.

For example, when the operator of the data processing device 100 selects the first images G1 and G3, by pointing the first images G1 and G3 displayed in the first region 112A through the input device 120, the display controller 131 accepts the selection of the first images G1 and G3, and causes the display device 110 to display the first images G1 and G3 selected, in the third region 112C.

Likewise, the operator of the data processing device 100 can select the second image, by pointing the second image displayed in the second region 112B through the input device 120. Upon accepting the selection of the second image, the display controller 131 causes the display device 110 to display the second image selected, in the third region 112C.

For example, when the operator of the data processing device 100 selects the second image H3, by pointing the second image H3 displayed in the second region 112B through the input device 120, the display controller 131 accepts the selection of the second image H3, and causes the display device 110 to display the second image H3 selected, in the third region 112C.

When the operator of the data processing device 100 touches the execution button 112D through the input device 120, the execution device 136 executes a predetermined operation, with respect to the image data to be processed, corresponding to the image to be processed displayed in the third region 112C. The predetermined operation to be executed by the execution device 136 includes, for example, transmitting the image data to be processed to the external device, and processing the image data to be processed. For example, the execution device 136 may perform compression, image processing, or restoration of the image data to be processed, as the processing operation.

Thus, the display controller 131 causes the display device 110 to display, for example, the first images G1 to G8 in the first region 112A, as selectable images. The display controller 131 also causes the display device 110 to display, for example, the second images H1 to H8 in the second region 112B, as selectable images.

Here, in the example shown in FIG. 2, neither the plurality of first images nor the plurality of second images include images originating from the same image data. However, the plurality of first images and the plurality of second images may include the images originating from the same image data.

In the example shown in FIG. 3, for example, the plurality of first images and the plurality of second images include the images originating from the same image data. In the illustrated example, the display controller 131 has caused the display device 110 to display eight first images G1 to G8 in the first region 112A, and eight second images H1 to H8 in the second region 112B.

Now, the first image G2 and the second image H3 originate from the same image data. The first image G2 is higher in image quality, than the second image H3. Accordingly, the display controller 131 causes the display device 110 to display the second image H3, as unselectable image. In this case, when the operator of the data processing device 100 touches the first image G2 through the input device 120, the display controller 131 accepts the selection of the first image G2, and causes the display device 110 to display the first image G2 in the third region 112C. On the other hand, even though the operator of the data processing device 100 touches the second image H3 through the input device 120, the display controller 131 does not accept the selection of the second image H3, and does not allow the display device 110 to display the second image H3 in the third region 112C. Therefore, when the operator of the data processing device 100 touches the execution button 112D through the input device 120, the execution device 136 can execute the processing with respect to the first image data corresponding to the first image G2, but not with respect to the second image data corresponding to the second image H3.

Here, for example when the second image H3 is the unselectable image, it is preferable that the display controller 131 causes the display device 110 to display the second image H3 in a grayout form. Such a display can keep the operator of the data processing device 100 from selecting the image corresponding to the image data of lower quality, among the plurality of pieces of image data originating from the same image data.

Further, the first image G4 and the second image H4 originate from the same image data. In the illustrated example, the second image H4 is higher in image quality, than the first image G4. Accordingly, the display controller 131 causes the display device 110 to display the first image G4, as unselectable image. In this case, when the operator of the data processing device 100 touches the second image H4 through the input device 120, the display controller 131 accepts the selection of the second image H4, and causes the display device 110 to display the second image H4 in the third region 112C. On the other hand, even though the operator of the data processing device 100 touches the first image G4 through the input device 120, the display controller 131 does not accept the selection of the first image G4, and does not allow the display device 110 to display the first image G4 in the third region 112C. Therefore, when the operator of the data processing device 100 touches the execution button 112D through the input device 120, the execution device 136 can execute the processing with respect to the second image data corresponding to the second image H4, but not with respect to the first image data corresponding to the first image G4.

Here, for example when the first image G4 is the unselectable image, it is preferable that the display controller 131 causes the display device 110 to display the first image G4 in the grayout form. Such a display can keep the operator of the data processing device 100 from selecting the image corresponding to the image data of lower quality, among the plurality of pieces of image data originating from the same image data.

Figure 4:
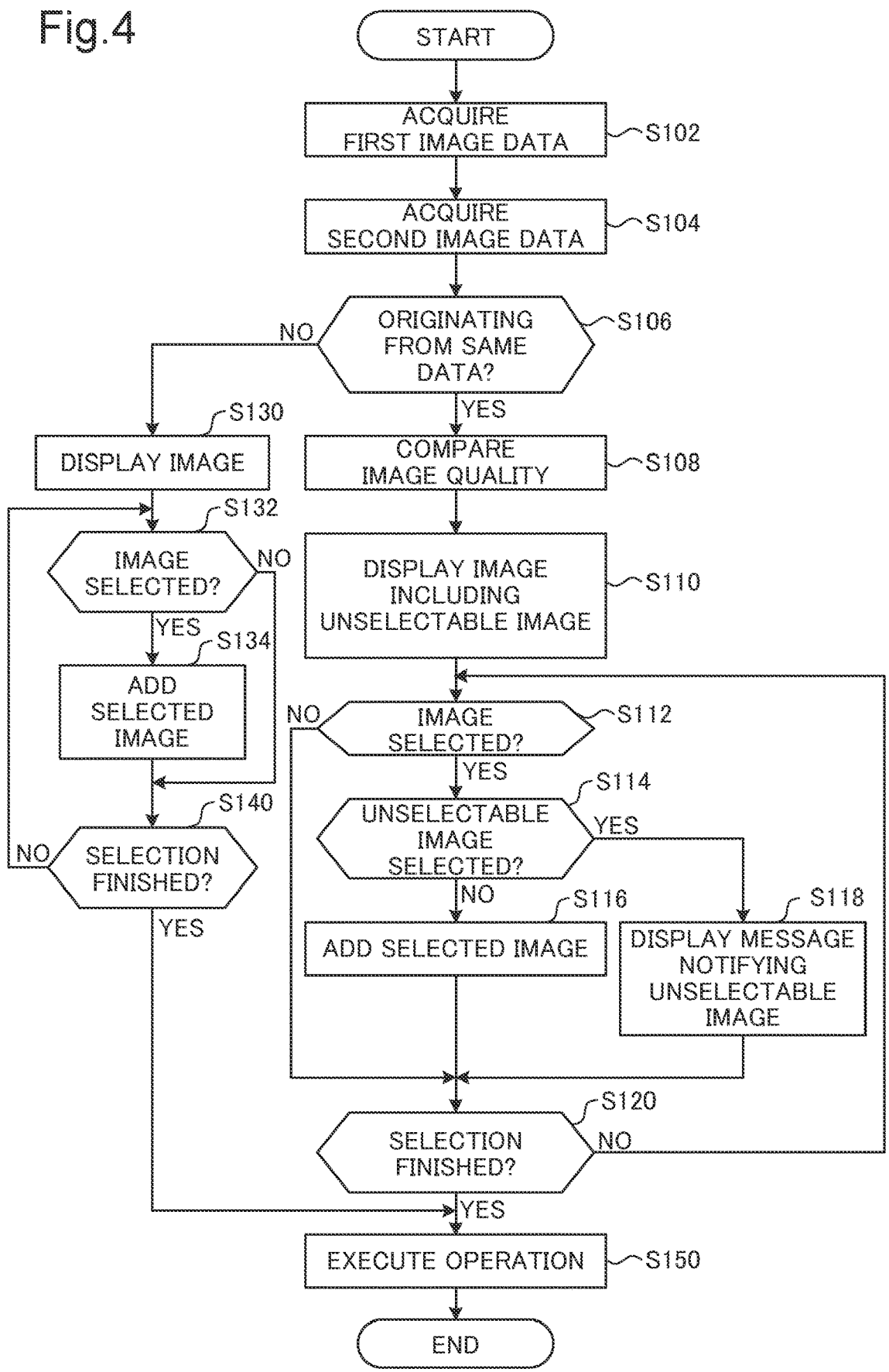
FIG. 4 is a flowchart showing a process of selecting an image to be processed, and performing a predetermined operation.

Referring now to FIG. 1 to FIG. 4, the selection process of the image to be processed, performed by the data processing device 100, will be described hereunder. FIG. 4 is a flowchart showing a process of selecting the image to be processed, and performing a predetermined operation.

Referring to FIG. 4, the first acquisition device 132 acquires the first image data at step S102. The first acquisition device 132 acquires the first image data, from the storage device 140 or the external device.

At step S104, the second acquisition device 133 acquires the second image data. The second acquisition device 133 acquires the second image data, from the storage device 140 or the external device.

At step S106, the collation device 134 decides whether the first image data and the second image data originate from the same image data.

When the first image data and the second image data originate from the same image data (Yes at step S106), the comparison device 135 proceeds to the operation of step S108. When the first image data and the second image data do not originate from the same image data (No at step S106), the display controller 131 proceeds to the operation of step S130.

At step S108, the comparison device 135 compares the image quality between the first image data and the second image data. For example, the comparison device 135 compares the data volume between the first image data and the second image data, and decides that the image data larger in data volume has higher image quality.

At step S110, the display controller 131 causes the display device 110 to display the image represented by the image data of higher quality, out of the first image data and the second image data, in a form that enables such image to be selected through the input device 120, and to display the image represented by the image data of lower quality out of the first image data and the second image data, in a form that disables such image from being selected through the input device 120. As a result, the image corresponding to the image data of higher quality is displayed as selectable image, and image corresponding to the image data of lower quality is displayed as unselectable image. For example, the display controller 131 causes the display device 110 to display the image represented by the image data of lower quality, out of the first image data and the second image data, in the grayout form. Here, when a plurality of pieces of first image data and a plurality of pieces of second image data are acquired, the display controller 131 causes the display device 110 to display the images represented by the image data not originating from the same image data, out of the plurality of pieces of first image data and the plurality of pieces of second image data, as selectable images.

At step S112, the display controller 131 decides whether at least one of the first image and the second image has been selected. Typically, when the operator of the data processing device 100 touches at least one of the first image and the second image through the input device 120, and then touches the selection confirmation button 112E, the display controller 131 accepts the selection of the touched image.

In the case where neither of the first image and the second image are selected (No at step S112), the display controller 131 proceeds to the operation of step S120. When at least one of the first image and the second image is selected (Yes at step S112), the display controller 131 proceeds to the operation of step S114.

At step S114, the display controller 131 decides whether the selected image is the unselectable image. When the selected image is not the unselectable image (No at step S114), the display controller 131 proceeds to the operation of step S116. When the selected image is the unselectable image (Yes at step S114), the display controller 131 proceeds to the operation of step S118.

At step S116, the display controller 131 adds the selected image, as image to be processed. Typically, the display controller 131 causes the display device 110 to display the selected image in the third region 112C.

At step S118, the display controller 131 causes the display device 110 to display a message to the effect that the selected image is the unselectable image.

At step S120, the display controller 131 decides whether the selection of the image to be processed is to be finished. Typically, when the operator of the data processing device 100 touches the execution button 112D displayed on the display device 110 through the input device 120, the display controller 131 accepts the instruction to finish the selection of the image to be processed.

In the case where the selection of the image is not to be finished yet (No at step S120), the display controller 131 returns to the operation of step S112. When the selection of the image is to be finished (Yes at step S120), the execution device 136 proceeds to the operation of step S150.

At step S130, the display controller 131 causes the display device 110 to display the first image represented by the first image data, and the second image represented by the second image data. Typically, the display controller 131 causes the display device 110 to display the first image and the second image as selectable images, on the basis of the first image data and the second image data respectively, without changing the first image data and the second image data.

At step S132, the display controller 131 decides whether at least one of the first image and the second image has been selected. Typically, when the operator of the data processing device 100 touches at least one of the first image and the second image through the input device 120, the display controller 131 accepts the selection of the touched image. In the case where neither of the first image and the second image are selected (No at step S132), the display controller 131 proceeds to the operation of step S140. When at least one of the first image and the second image is selected (Yes at step S132), the display controller 131 proceeds to the operation of step S134.

At step S134, the display controller 131 adds the selected image as image to be processed. Typically, the display controller 131 causes the display device 110 to display the selected image in the third region 112C.

At step S140, the display controller 131 decides whether the selection of the image to be processed is to be finished. Typically, when the operator of the data processing device 100 touches the execution button 112D displayed on the display device 110 through the input device 120, the display controller 131 accepts the instruction to finish the selection of the image to be processed.

In the case where the selection of the image is not to be finished yet (No at step S140), the display controller 131 returns to the operation of step S132. When the selection of the image is to be finished (Yes at step S140), the execution device 136 proceeds to the operation of step S150.

At step S150, the execution device 136 executes a predetermined operation, with respect to the image data to be processed corresponding to the image to be processed. With the configuration according to this embodiment, the image data of higher image quality can be easily selected, out of the plurality of pieces of image data originating from the same image data.

Here, the data processing device 100 may acquire one of the first image data and the second image data from the storage device 140, and the other of the first image data and the second image data from the external device. In addition, the data processing device 100 may generate a print job on the basis of the image data to be processed corresponding to the image to be processed, and transmit the print job to the image forming apparatus.

Figure 5:
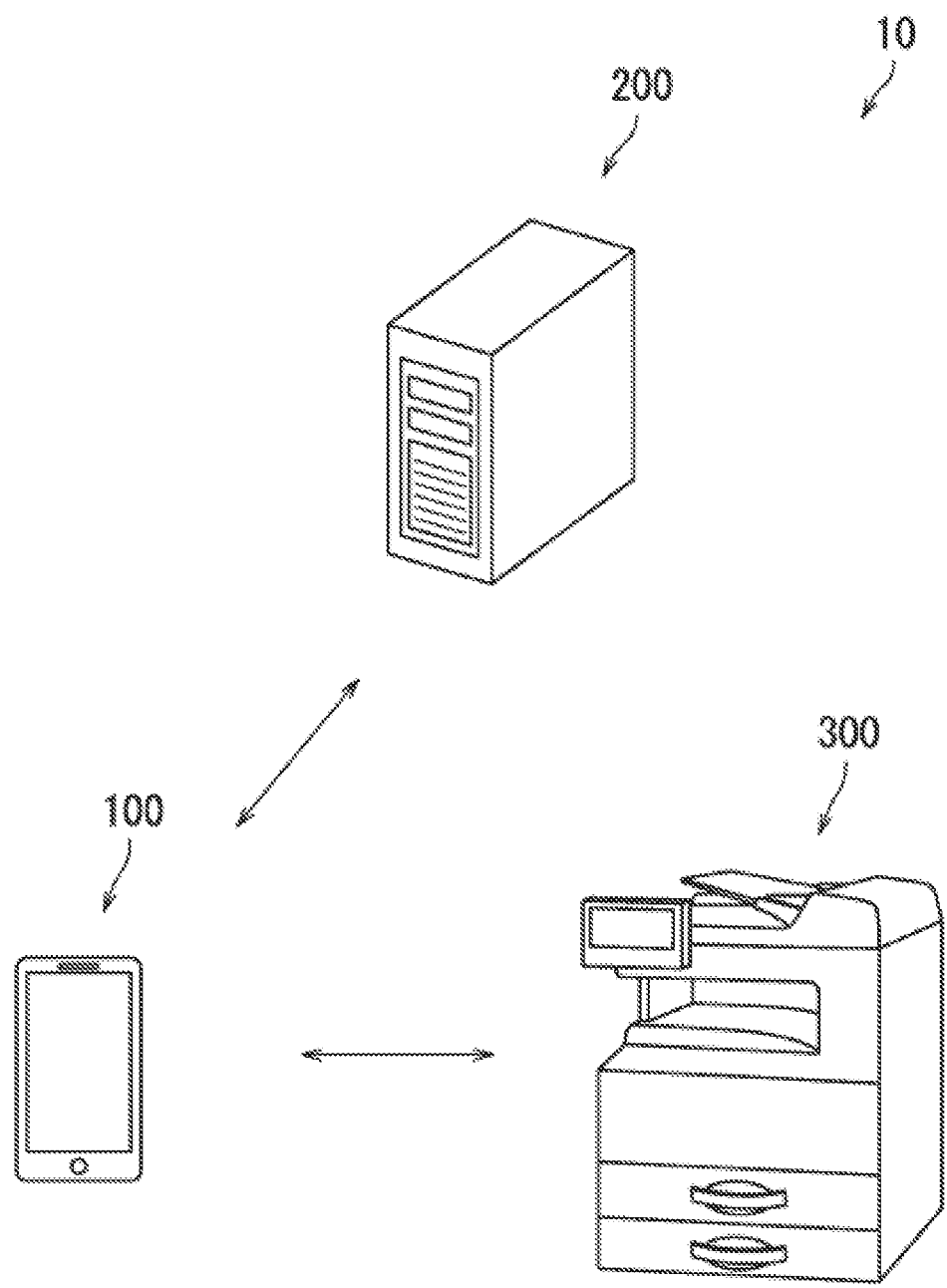
FIG. 5 is a schematic diagram showing a configuration of an image forming system.

Referring now to FIG. 5, a configuration of the image forming system 10 including the data processing device 100 will be described hereunder. FIG. 5 is a schematic diagram showing the configuration of the image forming system 10. In the image forming system 10 shown in FIG. 5, a part of the data processing device 100 is configured similarly to the data processing device 100 described with reference to FIG. 1 to FIG. 4, and therefore the description of the similar elements will not be repeated, for the sake of conciseness.

As shown in FIG. 5, the image forming system 10 includes the data processing device 100, a data storage device 200, and an image forming apparatus 300. Typically, the data processing device 100, the data storage device 200, and the image forming apparatus 300 are located away from each other.

The data processing device 100, the data storage device 200, and the image forming apparatus 300 are connected to each other via a network. Examples of the network include a local area network (LAN), and a wide area network (WAN). The network is not limited to a wireless or wired network.

The data processing device 100 communicates with the data storage device 200 and the image forming apparatus 300. For example, the data processing device 100 receives the image data stored in the data storage device 200, and displays the image represented by the image data. The data processing device 100 transmits the instruction to form the image represented by the image data, to the image forming apparatus 300.

In the data storage device 200, image data is stored. The data storage device 200 transmits the image data to the data processing device 100. Typically, the data storage device 200 is what is known as a server. The data storage device 200 may store the image data shared by a plurality of users. For example, the image data uploaded to a social networking service (SNS) is stored in the data storage device 200.

The image forming apparatus 300 forms an image on a sheet. The image forming apparatus 300 may be, for example, a printer, a copier, or a multifunction peripheral. The image forming apparatus 300 may also possess a facsimile function. In an example, the image forming apparatus 300 adopts the electrophotography process. Here, the image forming apparatus 300 itself may include a display device.

The data processing device 100 generates the print job on the basis of the image data, and transmits the print job to the image forming apparatus 300. The image forming apparatus 300 forms the image represented by the image data on the sheet, on the basis of the print job.

Figure 6:
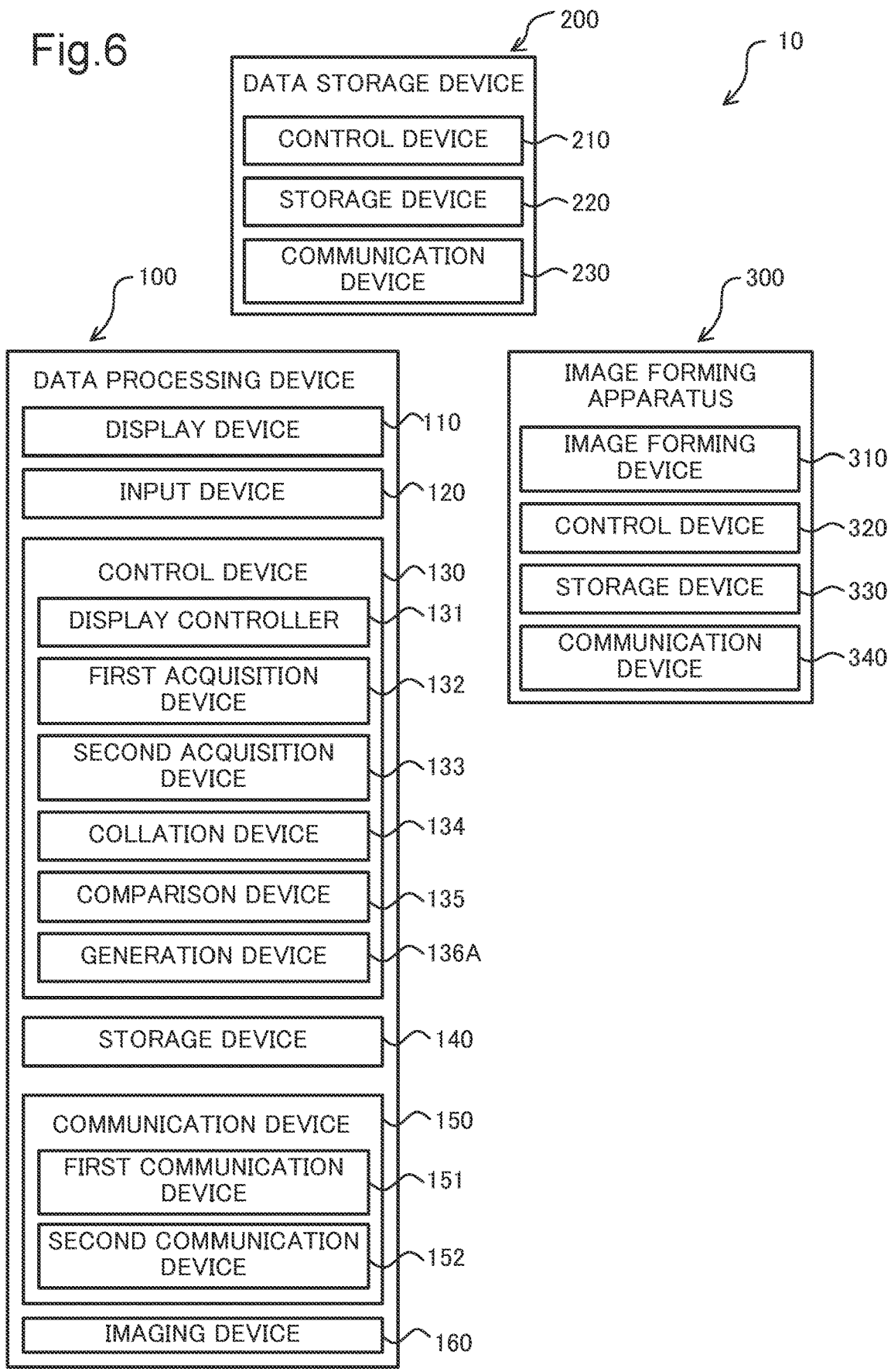
FIG. 6 is a block diagram schematically showing a configuration of components constituting the image forming system.

Referring now to FIG. 1 to FIG. 6, the configuration of each of the components, constituting the image forming system 10 according to this embodiment, will be described hereunder. FIG. 6 is a block diagram schematically showing the configuration of the components constituting the image forming system 10.

[Configuration of Data Processing Device 100]

As shown in FIG. 6, the data processing device 100 further includes a communication device 150, in addition to the display device 110, the input device 120, the control device 130, and the storage device 140. The communication device 150 communicates with the external device. For example, the communication device 150 receives the image data from the external device. The communication device 150 transmits a job to the external device.

The communication device 150 communicates with the data storage device 200. For example, the communication device 150 receives the image data from the data storage device 200. The communication device 150 also communicates with the image forming apparatus 300. For example, the communication device 150 transmits a job to the image forming apparatus 300.

The communication device 150 includes a first communication device 151 for communicating with the data storage device 200, and a second communication device 152 for communicating with the image forming apparatus 300. The first communication device 151 receives the image data from the data storage device 200. The second communication device 152 transmits the job to the image forming apparatus 300.

The storage device 140 contains the computer programs. The control device 130 acts as the display controller 131, the first acquisition device 132, the second acquisition device 133, the collation device 134, the comparison device 135, and an execution device 136A, by executing the computer programs.

The generation device 136A generates, according to the instruction inputted through the input device 120, the print job based on the image to be processed, which is one of the first image and the second image. The generation device 136A exemplifies the execution device in the appended claims.

The data processing device 100 may further include an imaging device 160. The imaging device 160 includes an image sensor. For example, the image sensor is a charge-coupled device (CCD) image sensor, or a complementary metal-oxide semiconductor (CMOS) image sensor. The imaging device 160 generates the image data. [Configuration of Data Storage Device 200] The data storage device 200 includes a control device 210, a storage device 220, and a communication device 230. The control device 210 controls the operation of the storage device 220 and the communication device 230.

The control device 210 includes an arithmetic element. The arithmetic element includes a processor. In an example, the processor includes a CPU. The processor may include an application-specific integrated circuit (ASIC).

The storage device 220 contains data and computer programs. The storage device 220 includes storage elements. The storage device 220 includes main storage elements such as a semiconductor memory, and auxiliary storage elements such as a semiconductor memory or a hard disk drive. The storage device 220 may include a removable medium.

For example, the computer programs are stored in a non-transitory, computer-readable storage medium. The non-transitory, computer-readable storage medium includes a ROM, a RAM, a CD-ROM, a magnetic tape, a magnetic disk, or an optical data storage device.

The image data is stored in the storage device 220. The storage device 220 also contains various types of data. For example, the storage device 220 contains the control programs. The control device 210 controls the operation of the storage device 220 and the communication device 230, utilizing the control programs stored in the storage device 220.

The control device 210 controls the operation of the data storage device 200, by executing the control programs. To be more specific, the processor of the control device 210 controls the operation of each of the components of the data storage device 200, by executing the computer programs stored in the storage element of the storage device 220.

The communication device 230 communicates with the external device. For example, the communication device 230 receives the image data from the external device. In an example, the communication device 230 communicates with the data processing device 100. For example, the communication device 230 receives the image data from the data processing device 100.

[Configuration of Image Forming Apparatus 300]

The image forming apparatus 300 incudes an image forming device 310, a control device 320, a storage device 330, and a communication device 340. The control device 320 controls the operation of the image forming device 310, the storage device 330, and the communication device 340.

The image forming device 310 forms an image on the sheet, according to the print job. The image forming device 310 forms the image on the sheet, for example using toner or ink. Examples of the sheet include a plain paper, a recycled paper, a thin paper, a thick paper, and a coated paper.

The control device 320 includes an arithmetic element. The arithmetic element includes a processor. In an example, the processor is a CPU.

The storage device 330 contains data and the computer programs. The storage device 330 includes storage elements. The storage device 330 includes main storage elements such as a semiconductor memory, and auxiliary storage elements such as a semiconductor memory or a hard disk drive. The storage device 330 may include a removable medium. The processor of the control device 320 controls the operation of each component of the image forming apparatus 300, by executing the computer programs stored in the storage element of the storage device 330.

For example, the computer programs are stored in a non-transitory, computer-readable storage medium. The non-transitory, computer-readable storage medium includes a ROM, a RAM, a CD-ROM, a magnetic tape, a magnetic disk, or an optical data storage device.

In the storage device 330, the image data representing the image to be formed on the sheet is stored.

The communication device 340 communicates with the external device. For example, the communication device 340 receives the image data from the external device. In an example, the communication device 340 communicates with the data processing device 100. For example, the communication device 340 receives the print job, from the data processing device 100.

Figure 7:
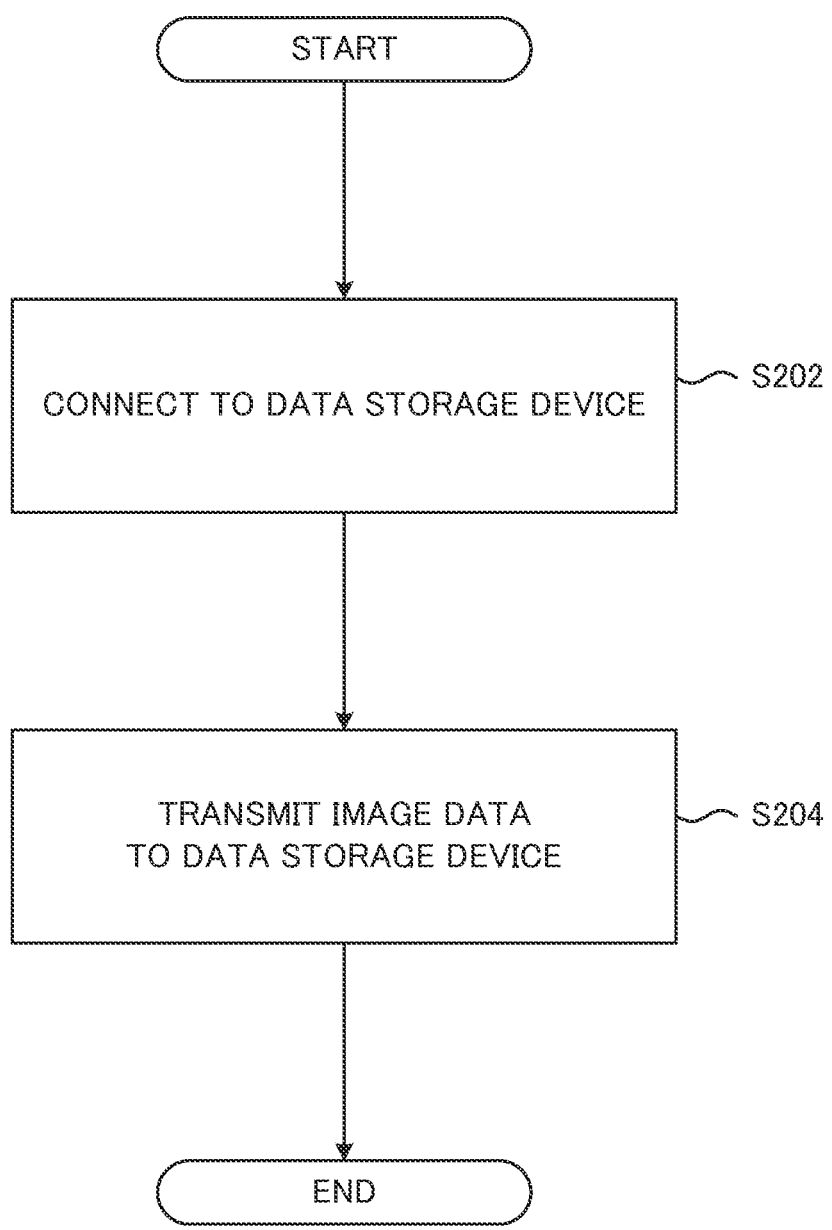
FIG. 7 is a flowchart showing an uploading process.

Referring now to FIG. 1 to FIG. 7, an uploading process, for uploading the image data from the data processing device 100 to the data storage device 200, will be described hereunder. FIG. 7 is a flowchart showing the uploading process. In this example, the imaging device 160 of the data processing device 100 generates the image data, by shooting an image.

As shown in FIG. 7, the communication device 150 makes connection with the data storage device 200, at step S202. Typically, when operator of the data processing device 100 inputs, through the input device 120, the instruction to upload the image data stored in the storage device 140 to the data storage device 200, the communication device 150 makes connection with the data storage device 200.

At step S204, the communication device 150 transmits the image data stored in the storage device 140, to the data storage device 200. The image data may be generated by the imaging device 160. The image data is stored in the data storage device 200.

Here, the data storage device 200 may compress the image data, when storing therein the image data. Alternatively, the data storage device 200 may compress the image data, when a predetermined period elapses after the image data is stored.

Referring to FIG. 1 to FIG. 8, the print job execution process, in which the data processing device 100 receives and displays the image data transmitted from the data storage device 200, and transmits the print job to the image forming apparatus 300, will be described hereunder. FIG. 8 is a flowchart showing the print job execution process.

At step S302, the first acquisition device 132 acquires the first image data. At step S304, the second acquisition device 133 acquires the second image data. In an example, the first acquisition device 132 retrieves the first image data, from the storage device 140.

In another example, the communication device 150 makes connection with the data storage device 200. Typically, when the operator of the data processing device 100 inputs, through the input device 120, the instruction to make access to the image data stored in the data storage device 200, the communication device 150 communicates with the data storage device 200. The communication device 150 receives the image data stored in the data storage device 200, from the data storage device 200. The image data may be the data generated by the data processing device 100 in the past, or the data generated by another device in the past. As result of the acquisition of the first image data from the data storage device 200 by the communication device 150, the first acquisition device 132 acquires the first image data. As result of the receipt of the second image data from the data storage device 200 by the communication device 150, the second acquisition device 133 acquires the second image data.

At step S305, the display controller 131 decides, for example, whether an image quality preference mode is selected. As a typical example, the display controller 131 decides whether the image quality preference mode is selected, depending on whether the operator of the data processing device 100 has inputted the instruction to give priority to the image quality, through the input device 120.

In the case where the image quality preference mode is not selected (No at step S305), the display controller 131 proceeds to the operation of step S330. When the image quality preference mode is selected (Yes at step S305), the collation device 134 proceeds to the operation of step S306.

At step S306, the collation device 134 decides whether the first image data and the second image data originate from the same data.

In the case where the first image data and the second image data originate from the same data (Yes at step S306), the comparison device 135 proceeds to the operation of step S308. In the case where the first image data and the second image data do not originate from the same data (No at step S306), the display controller 131 proceeds to the operation of step S330.

At step S308, the comparison device 135 compares the image quality between the first image data and the second image data.

At step S310, the display controller 131 causes the display device 110 to display the image represented by the image data of higher quality, out of the first image data and the second image data, in a form that enables such image to be selected through the input device 120, and to display the image represented by the image data of lower quality out of the first image data and the second image data, in a form that disables such image from being selected through the input device 120.

At step S312, the display controller 131 decides whether at least one of the first image and the second image has been selected. Typically, when the operator of the data processing device 100 touches at least one of the first image and the second image through the input device 120, and then touches the selection confirmation button 112E, the display controller 131 accepts the selection of the touched image.

In the case where neither of the first image and the second image are selected (No at step S312), the display controller 131 proceeds to the operation of step S320. When at least one of the first image and the second image is selected (Yes at step S312), the display controller 131 proceeds to the operation of step S314.

At step S314, the display controller 131 decides whether the selected image is the unselectable image. When the selected image is not the unselectable image (No at step S314), the display controller 131 proceeds to the operation of step S316. When the selected image is the unselectable image (Yes at step S314), the display controller 131 proceeds to the operation of step S318.

At step S316, the display controller 131 adds the selected image, as image to be processed. Typically, the display controller 131 causes the display device 110 to display the selected image in the third region 112C.

At step S318, the display controller 131 causes the display device 110 to display a message to the effect that the selected image is the unselectable image.

At step S320, the display controller 131 decides whether the selection of the image to be processed is to be finished. Typically, when the operator of the data processing device 100 touches the execution button 112D displayed on the display device 110 through the input device 120, the display controller 131 accepts the instruction to finish the selection of the image to be processed.

In the case where the selection of the image is not to be finished yet (No at step S320), the display controller 131 returns to the operation of step S312. When the selection of the image is to be finished (Yes at step S320), the generation device 136A proceeds to the operation of step S350.

At step S330, the display controller 131 causes the display device 110 to display the first image represented by the first image data, and the second image represented by the second image data. Typically, the display controller 131 causes the display device 110 to display the first image and the second image as selectable images, on the basis of the first image data and the second image data respectively, without changing the first image data and the second image data.

At step S332, the display controller 131 decides whether at least one of the first image and the second image has been selected. Typically, when the operator of the data processing device 100 touches at least one of the first image and the second image through the input device 120, the display controller 131 accepts the selection of the touched image. In the case where neither of the first image and the second image are selected (No at step S332), the display controller 131 proceeds to the operation of step S340. When at least one of the first image and the second image is selected (Yes at step S332), the display controller 131 proceeds to the operation of step S334.

At step S334, the display controller 131 adds the selected image as image to be processed.

At step S340, the display controller 131 decides whether the selection of the image to be processed is to be finished. Typically, when the operator of the data processing device 100 touches the execution button 112D displayed on the display device 110 through the input device 120, the display controller 131 accepts the instruction to finish the selection of the image to be processed.

In the case where the selection of the image is not to be finished yet (No at step S340), the display controller 131 returns to the operation of step S332. When the selection of the image is to be finished (Yes at step S340), the generation device 136A proceeds to the operation of step S350.

At step S350, the generation device 136A transmits the print job, generated on the basis of the image data to be processed corresponding to the image to be processed, to the image forming apparatus 300. For example, the generation device 136A generates the print job on the basis of the image data to be processed. The generation device 136A causes the second communication device 152 to transmit the print job, to the image forming apparatus 300.

With the configuration according to this embodiment, the image data of higher image quality can be easily selected, out of the plurality of pieces of image data originating from the same image data, and the print job based on the image data of higher image quality can be easily generated.

The embodiment of the disclosure has been described as above, with reference to the drawings. However, the disclosure is not limited to the foregoing embodiment, but may be modified in various manners, without departing from the scope of the disclosure. In addition, inventions of various forms can be created, by combining the plurality of elements disclosed in the foregoing embodiment. For example, some elements may be excluded, from all the elements disclosed in the foregoing embodiment. Further, the elements referred to in different embodiments may be combined, as the case may be. The drawings each schematically illustrate the elements for the sake of clarity, and the thickness, length, number of pieces, and interval of the illustrated elements may be different from the actual ones, because of the convenience in making up the drawings. Further, the material, shape, and size of the elements referred to in the foregoing embodiment are merely exemplary and not specifically limited, and may be modified as desired, without substantially departing from the configuration according to the disclosure.

Although the first acquisition device 132 and the second acquisition device 133 are configured to acquire the image data representing photos, according to the foregoing embodiment, the present invention is not limited to such embodiment. For example, the first acquisition device 132 and the second acquisition device 133 may acquire the data of a text or a document. In this case, the comparison device 135 may compare the quality between the data acquired by the first acquisition device 132, and the data acquired by the second acquisition device 133.

INDUSTRIAL APPLICABILITY

The present invention is advantageously applicable to data processing devices and image forming systems.

The invention claimed is:

1. A data processing device comprising:
a display device;
an input device through which an instruction of an operator is inputted;
a first acquisition device that acquires first image data;
a second acquisition device that acquires second image data;
a collation device that decides whether the first image data and the second image data originate from same image data;
a comparison device that compares image quality between the first image data and the second image data, when the first image data and the second image data originate from the same image data;
a display controller that causes the display device to display, according to a comparison result from the comparison device, one of a first image represented by the first image data and a second image represented by the second image data, as a selectable image, and the other of the first image and the second image as an unselectable image; and
an execution device that executes, upon receipt of an instruction to select the selectable image through the input device, a predetermined operation with respect to the image data corresponding to the selectable image selected, but keeps from executing, despite receiving an instruction to select the unselectable image through the input device, the predetermined operation with respect to the image data corresponding to the unselectable image selected.

2. The data processing device according to claim 1, wherein the display controller causes the display device to display the other image designated as the unselectable image, in a grayout form.

3. The data processing device according to claim 1, further comprising a storage device for storing the first image data,
wherein the first acquisition device retrieves the first image data from the storage device.

4. The data processing device according to claim 1, further comprising a communication device that communicates with a data storage device in which the second image data is stored,
wherein the second acquisition device acquires the second image data from the data storage device, through the communication device.

5. The data processing device according to claim 1, further comprising a communication device that communicates with an image forming apparatus,
Wherein the execution device generates, upon receipt of an instruction for selecting the selectable image through the input device, a print job on a basis of image data corresponding to the selectable image selected, and causes the communication device to transmit the print job to the image forming apparatus.

6. The data processing device according to claim 1,
wherein the display controller causes the display device to display an image of higher image quality, out of the first image and the second image, as the selectable image, and to display an image of lower image quality out of the first image and the second image, as the unselectable image.

7. The data processing device according to claim 1,
Wherein, in a case where the first image data and the second image data do not originate from the same image data, the display controller causes the display device to display the first image and the second image, as the selectable image.

8. An image forming system comprising:
a data storage device;
a data processing device; and
an image forming apparatus,
wherein the data storage device includes:
a first storage device for storing second image data;
a first communication device that communicates with the data processing device; and
a first control device that transmits the second image data to the data processing device via the first communication device,
the data processing device includes:
a display device;
an input device through which an instruction of an operator is inputted;
a second storage device for storing first image data;
a second communication device that communicates with the data storage device;
a first acquisition device that acquires the first image data from the second storage device;
a second acquisition device that acquires, via the second communication device, the second image data transmitted from the data storage device;
a collation device that decides whether the first image data and the second image data originate from same image data;
a comparison device that compares image quality between the first image data and the second image data, when the first image data and the second image data originate from the same image data;
a display controller that causes the display device to display, according to a comparison result from the comparison device, one of a first image represented by the first image data and a second image represented by the second image data, as a selectable image, and the other of the first image and the second image as an unselectable image; and
a generation device that generates, upon receipt of an instruction to select the selectable image through the input device, a print job based on the image data corresponding to the selectable image selected, and transmits the print job to the image forming apparatus via the second communication device, but keeps from generating, despite receiving an instruction to select the unselectable image through the input device, the print job based on the image data corresponding to the unselectable image selected, and the image forming apparatus includes:

a third communication device that communicates with the data processing device;

an image forming device that executes the print job thereby forming an image on a recording medium; and a second control device that causes the image forming device to execute the print job, upon acquiring the print job via the third communication device.

9. A data processing device comprising:

a display device;

an input device through which an instruction of an operator is inputted;

a first acquisition device that acquires first data;

a second acquisition device that acquires second data;

a collation device that decides whether the first data and the second data originate from same data;

a comparison device that compares quality between the first data and the second data, when the first data and the second data originate from the same data;

a display controller that causes the display device to display, according to a comparison result from the comparison device, one of a first image represented by the first data and a second image represented by the second data, as a selectable image, and the other of the first image and the second image as an unselectable image; and an execution device that executes, upon receipt of an instruction to select the selectable image through the input device, a predetermined operation with respect to the data corresponding to the selectable image selected, but keeps from executing, despite receiving an instruction to select the unselectable image through the input device, the predetermined operation with respect to the data corresponding to the unselectable image selected.

* * * * *